(12) United States Patent
Swanson

(10) Patent No.: US 10,285,397 B2
(45) Date of Patent: May 14, 2019

(54) TREE STAND/SEAT COVER

(71) Applicant: Erick Swanson, Cleveland, OH (US)

(72) Inventor: Erick Swanson, Cleveland, OH (US)

( * ) Notice: Subject to any disclaimer, the term of this patent is extended or adjusted under 35 U.S.C. 154(b) by 0 days.

(21) Appl. No.: 15/422,908

(22) Filed: Feb. 2, 2017

(65) Prior Publication Data
US 2017/0215408 A1    Aug. 3, 2017

Related U.S. Application Data

(60) Provisional application No. 62/290,610, filed on Feb. 3, 2016.

(51) Int. Cl.
*A01M 31/02* (2006.01)
*E04H 15/04* (2006.01)
*E04H 15/00* (2006.01)

(52) U.S. Cl.
CPC .......... *A01M 31/025* (2013.01); *A01M 31/02* (2013.01); *E04H 15/001* (2013.01); *E04H 15/04* (2013.01)

(58) Field of Classification Search
CPC ...... E04H 15/001; E04H 15/04; A01M 31/00; A01M 31/025
See application file for complete search history.

(56) References Cited

U.S. PATENT DOCUMENTS

| | | | | | |
|---|---|---|---|---|---|
| 3,383,814 A | * | 5/1968 | Rowe | ................... | A45B 17/00 135/21 |
| 3,498,305 A | * | 3/1970 | Hulin | ..................... | E04H 15/04 135/117 |
| 3,545,461 A | * | 12/1970 | Carlson | .................. | E04H 15/04 135/100 |
| 4,284,095 A | * | 8/1981 | Norton | ................... | A45B 25/14 135/21 |
| 4,449,542 A | * | 5/1984 | McSwain | ............. | A01M 31/00 135/16 |
| 4,505,286 A | * | 3/1985 | Madion | ................. | A01M 31/02 135/117 |
| 4,526,307 A | * | 7/1985 | Parker | ..................... | E04H 15/04 135/95 |
| 4,825,578 A | * | 5/1989 | Robinson | ........... | A01M 31/025 135/90 |
| 5,269,332 A | * | 12/1993 | Osborne | ................ | E04H 15/04 114/361 |
| 5,385,164 A | * | 1/1995 | Sauter | ................... | A01M 31/02 135/87 |
| 5,528,849 A | * | 6/1996 | Plinta | .................. | A01M 31/025 135/126 |
| 5,630,439 A | * | 5/1997 | Hutto | .................... | E04H 15/001 135/90 |

(Continued)

*Primary Examiner* — David R Dunn
*Assistant Examiner* — Danielle Jackson
(74) *Attorney, Agent, or Firm* — Fay Sharpe LLP

(57) ABSTRACT

Apparatuses, devices and methods for covering a tree stand are disclosed. The methods include placing a collapsible cover in the size and shape of an artificial or simulated hunter in position on a tree stand for a period of time to allow game to become accustom to the artificial hunter; and removing the cover and replacing the cover with an actual hunter. The apparatuses include a cover having a top portion, a bottom portion, and a body portion extending between the top and bottom portions. A generally horizontally oriented support member is located above the top portion of the cover and extends between a first end and a distal end. A height adjustment mechanism is disposed on the distal end of the support member and attached to the top portion of the cover.

20 Claims, 12 Drawing Sheets

(56) References Cited

U.S. PATENT DOCUMENTS

| | | | | | |
|---|---|---|---|---|---|
| 5,682,701 | A | * | 11/1997 | Gammon | A01M 31/06 40/538 |
| 6,338,356 | B1 | * | 1/2002 | Wallenstatter | E04H 15/04 135/100 |
| 7,849,866 | B1 | * | 12/2010 | Mangum | A47K 11/04 135/117 |
| 8,381,749 | B1 | * | 2/2013 | Ashmore, Jr. | E04H 15/001 135/90 |
| 2002/0036007 | A1 | * | 3/2002 | Sellers | E04H 15/001 135/90 |
| 2002/0152665 | A1 | * | 10/2002 | Varnado | A01M 31/025 43/1 |
| 2003/0029074 | A1 | * | 2/2003 | Volz | A01M 31/06 43/2 |
| 2005/0081272 | A1 | * | 4/2005 | Shaklee | A01M 31/025 2/4 |
| 2006/0076043 | A1 | * | 4/2006 | Talley | E04H 15/001 135/98 |
| 2007/0028438 | A1 | * | 2/2007 | Missey | E04H 15/001 29/558 |
| 2007/0144570 | A1 | * | 6/2007 | Cooper | A01M 31/025 135/90 |
| 2009/0272019 | A1 | * | 11/2009 | Espenkotter | A01M 31/025 43/1 |
| 2010/0252083 | A1 | * | 10/2010 | Ogle | E04H 15/04 135/90 |
| 2012/0080916 | A1 | * | 4/2012 | Stringer | A01M 31/025 297/217.1 |
| 2015/0217150 | A1 | * | 8/2015 | Harris | A62B 35/0093 182/5 |

\* cited by examiner

TREE STAND/SEAT COVER

This application claims the benefit of U.S. Provisional Application No. 62/290,610 filed Feb. 3, 2016 and titled "TREE STAND/SEAT COVER." U.S. Provisional Application No. 62/290,610 filed Feb. 3, 2016, is incorporated herein by reference in its entirety.

BACKGROUND

The present disclosure relates to a covering apparatus including a collapsible cover and associated support members which maintain the cover in a desired configuration over time. It finds particular application in conjunction with protecting tree stands and/or associated seats therein, and will be described with particular reference thereto.

Tree stands are elevated platforms often used in connection with hunting game in wooded or semi-wooded environments. Proper placement of a tree stand requires the consideration of numerous factors, such as the cover provided by surrounding trees and habits of the game being hunted. Some types of game, such as deer, are well-attuned to the nature of their surrounding environment. Objects which are foreign to the environment in which deer visit can easily startle and scare them off. As such, a tree stand occupied by a hunter is likely to startle deer, even when the tree stand is placed in a location having adequate cover.

It would be desirable to provide an apparatus for acclimating deer to an environment which includes a tree stand occupied by a hunter.

BRIEF DESCRIPTION

In accordance with some aspects of the present disclosure, an apparatus for protecting and/or covering a tree stand, or an associated seat, is disclosed. The apparatus is configured in a manner to assimilate the approximate size and/or shape of a hunter ("artificial hunter"). The apparatus is installed a sufficient period of time prior to hunting season to allow various types of game animals, such as deer, to become accustom to the size and/or shape of the artificial hunter. During hunting season, the apparatus is removed and replaced with an actual hunter. Since the surrounding game have been acclimated to the size and/or shape of the artificial hunter, the game are less sensitive to the sight or presence of the actual hunter.

In certain embodiments, the tree stand/seat cover includes a cover having a top portion, a bottom portion, and a body portion extending between the top and bottom portions. A generally horizontally oriented support member is located above the top portion of the cover and extends between a first end and a distal end. A height adjustment mechanism is disposed on the distal end of the support member and is attached to the top portion of the cover. The support member is mounted at a first position, the cover is suspended from the distal end of the support member via the height adjustment mechanism at the first position, and the bottom portion of the cover is mounted at a second position.

In accordance with additional aspects of the present disclosure, a method for using a tree stand cover is disclosed. The method includes attaching a support member to a mounting surface such that the support member is oriented generally horizontal from the mounting surface. A top portion of a cover is suspended from the support member such that the cover extends along a vertical axis adjacent to the mounting surface. A bottom portion of the cover is connected to a tree stand attached to the mounting surface to define a covering configuration. The cover is left in the covering configuration for a period of time to acclimate an environment to size and shape of the cover.

Further aspects of the method for using a tree stand cover include de-connecting the bottom portion of the cover from the tree stand. The bottom portion of the cover is then lifted toward the top portion such that the cover is collapsed against the mounting surface. The bottom portion of the cover is then attached adjacent to the support member to define a storing configuration.

In accordance with some further aspects of the present disclosure, a tree stand/seat cover for assimilating game to the size and/or shape of a hunter is disclosed. The tree stand cover includes a collapsible cover that is configurable between a covering configuration and a storing configuration. The cover includes a top portion, a bottom portion, and a body portion extending between the top and bottom portions. One or more support frames are included on the cover and are adapted to maintain one or more shapes of the cover. A generally horizontally oriented support member is located above the top portion of the cover and extends between a first end and a distal end. A height adjustment mechanism is disposed on the distal end of the support member and attached to the top portion of the cover. A first adjustable support strap is attached to the support member and a second adjustable support strap is attached to the bottom portion of the cover. The first support strap is adapted to mount the support member at a first position and the cover is suspended from the distal end of the support member via the height adjustment mechanism. The second support strap is adapted to mount the bottom portion of the cover at a second position. The covering configuration corresponds to the first and second positions being spaced apart from each other such that the cover fully extends from the distal end of the support member. The storing configuration corresponds to the first and second positions being adjacent to each other such that the cover is collapsed.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The embodiments disclosed herein relate to an apparatus for covering a tree stand/seat and to methods for acclimating game to a hunting environment using the apparatus. Certain embodiments of the disclosed methods include placing a collapsible cover above or on the tree stand for a period of time to allow game to become accustom to the artificial hunter. The period of time for which the cover is in position can generally occur any time prior to hunting season. During this time, the cover is configured in a covering configuration (FIGS. 1 and 3) which assimilates the approximate size and shape of an artificial or simulated hunter in position on a tree stand.

In some embodiments, the covering configuration refers to the cover disguising the area occupied by a tree stand when the tree stand is not being used by an actual hunter (e.g., the hunting offseason). A bottom portion of the cover generally surrounds the area occupied by the tree stand, while a body and top portion of the cover extend a height above the tree stand. The dimensions of the cover are approximately equal to size and shape of a person sitting on the tree stand. In such embodiments, the cover is left in the covering configuration for a period of time to acclimate the surrounding environment to the sight of the cover. The surrounding environment includes game animals, such as deer, which visit the area where the cover is located. The period of time can be the entire hunting offseason or any time needed to acclimate the surrounding environment to the cover.

Once a determination is made that the environment has become accustomed to the cover, the cover is removed and replaced with an actual hunter. In some embodiments, the cover can be configured into a storing configuration (FIGS. 7 and 8) making it easier for the actual hunter to use the tree stand. As a result of leaving the cover in its covering configuration to acclimate the environment to the cover, the environment is less likely to react to the sight of an actual hunter using the tree stand. For example, if the tree stand is being used in connection with hunting deer, the deer are less likely to react to a hunter positioned on the tree stand, the deer having been previously acclimated to a similar sight (i.e., the cover assimilating the size and shape of an artificial hunter). Once the actual hunter is finished using the tree stand, the cover can be returned to the covering configuration.

In some further embodiments, the cover in the covering configuration can disguise both the tree stand and an actual hunter positioned on the tree stand. In such embodiments, the cover disguises movements and other actions of the actual hunter which may startle the environment. Using the previous example of hunting deer, the cover disguises movements of the hunter which otherwise might cause the deer to run off.

Figure 1:
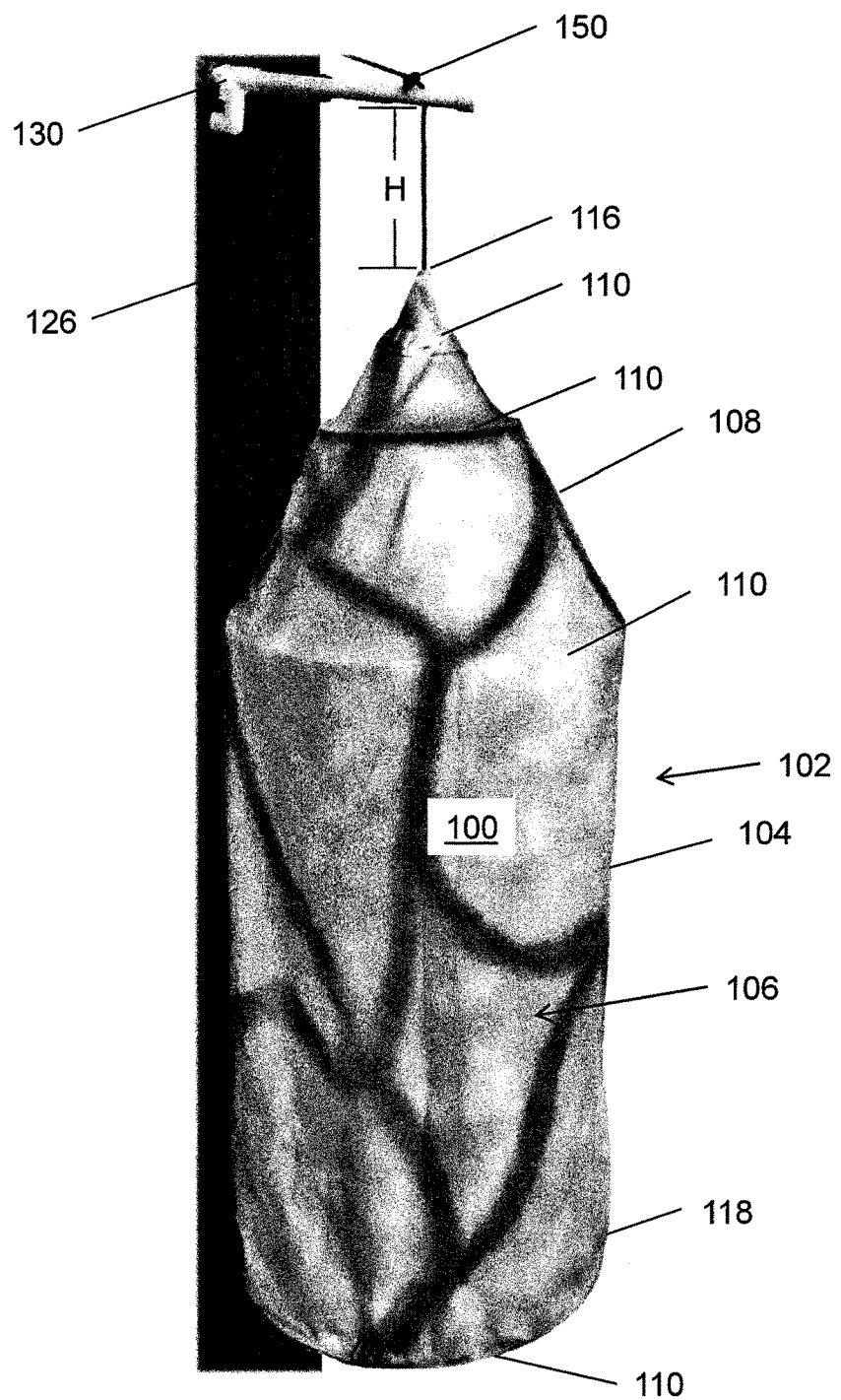
FIG. 1 is a side view picture of a cover in a covering configuration to be used in connection with an apparatus for covering a tree stand/seat.

With reference to FIG. 1, aspects of an apparatus 100 for covering a tree stand/seat are shown. A cover 102 is adapted to assimilate game to the size and/or shape of a hunter. The cover 102 is shown in a covering configuration and generally includes a top portion 108, a bottom portion 118, and a body portion 104. The outer surface 106 is adapted to camouflage the cover depending on the environment in which the cover is used. In other words, the outer surface 106 can be provided with any combination of materials, coloration, or illumination for concealment, either by making the cover difficult to see, or by disguising the cover as something else.

The cover 102 can be made from any material known in the art suitable for outdoor use. In some embodiments, the material is fabric having a strength-to-weight ratio that gives the cover a light-weight and tear-resistant properties. Additional desirable properties of the material include printability, durability, breathability, water-proof or water-resistance, and collapsibility. In some particular embodiments, the cover is made from a 70 denier nylon fabric.

The cover 102 includes one or more support frames 110 adapted to maintain one or more shapes of the cover. The one or more shapes generally approximate the size and shape of a hunter. The one or more support frames 110 are shown as having a ring shape which maintains a cylindrical shape in the body of the cover. The one or more support frames can also vary in size or shape to maintain a combination of shapes in the cover, such as a square or triangular shape. The support frames 110 in the top portion 108 of the cover are rings having a smaller diameter than the support frames in the body portion 104 of the cover. The smaller diameter rings are concentrically aligned and spaced vertically apart to maintain a frustoconical shape in the top portion 108 of the cover. The support frames 110 can be made from any material known in the art which provides the necessary weight and rigidity to maintain a desired shape in the cover 102, such as metal, wood, plastic, or fiberglass.

In some embodiments, the one or more support frames 110 are fixedly attached to the cover 102 by sewing the one or more support frames directly onto or within the cover. However, it is also contemplated that the one or more support frames 110 can be removable. In such embodiments, the one or more support frames 110 are removably attached to the cover by a variety of means including hook and loop style straps, clips, sleeves, and other fastening hardware known to those having skill in the art. The one or more support frames could then be removed from the cover 102 to aid in cleaning, repairing, and or transporting the cover.

It should be understood from the present disclosure that the one or more support frames 110 are sized to give the cover 102 adequate dimensions for covering a desired area. In some embodiments, the desired covering area is limited to that of the area occupied by a tree stand (not shown). In such embodiments, the bottom portion 118 of the cover 102 is sized to surround the area occupied by the tree stand, with the body and top portions 104, 108 of the cover extending a height approximately equal to that of a person sitting on the tree stand. In this regard, the cover represents an artificial or simulated hunter having the approximate size and shape of an actual hunter.

Figure 2:
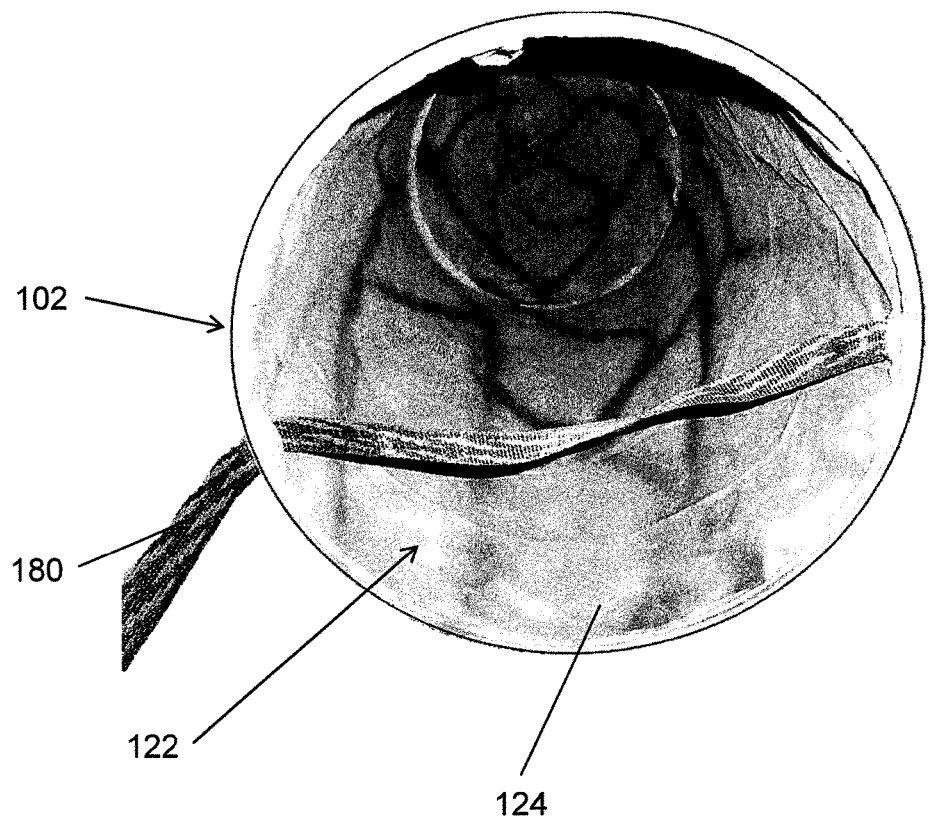
FIG. 2 is a bottom view picture showing additional aspects of the cover pictured in FIG. 1.

In other embodiments, the desired covering area is larger than just the area occupied by the tree stand. It is contemplated that in such embodiments, the cover will be used while a person is sitting on the tree stand. In this regard, the cover is sized such that a person can comfortably move within the cover 102. With reference to FIG. 2, the cover 102 includes a hollow interior region 122 defined by an inner surface 124 of the cover. A person generally occupies the hollow interior region 122 when the tree stand is being used.

The cover 102 can include any number of features adapted to enhance user-friendliness. For example, the cover 102 could include one or more reflective portions (FIG. 10) on the outer surface 106 to aid in locating the cover in dark conditions. In addition, the cover 102 could have one or more windows (not shown) extending through the outer and inner surfaces 106, 124 to allow a person using the cover to see outside. The cover 102 could also include one or more mesh portions (not shown) extending through the outer and inner surfaces 106, 124 to permit airflow through the cover. A number of storage areas (not shown), such as pockets, shelves, etc., could also be located within the interior region 122 and attached to the inner surface 124 of the cover 102.

Figure 4:
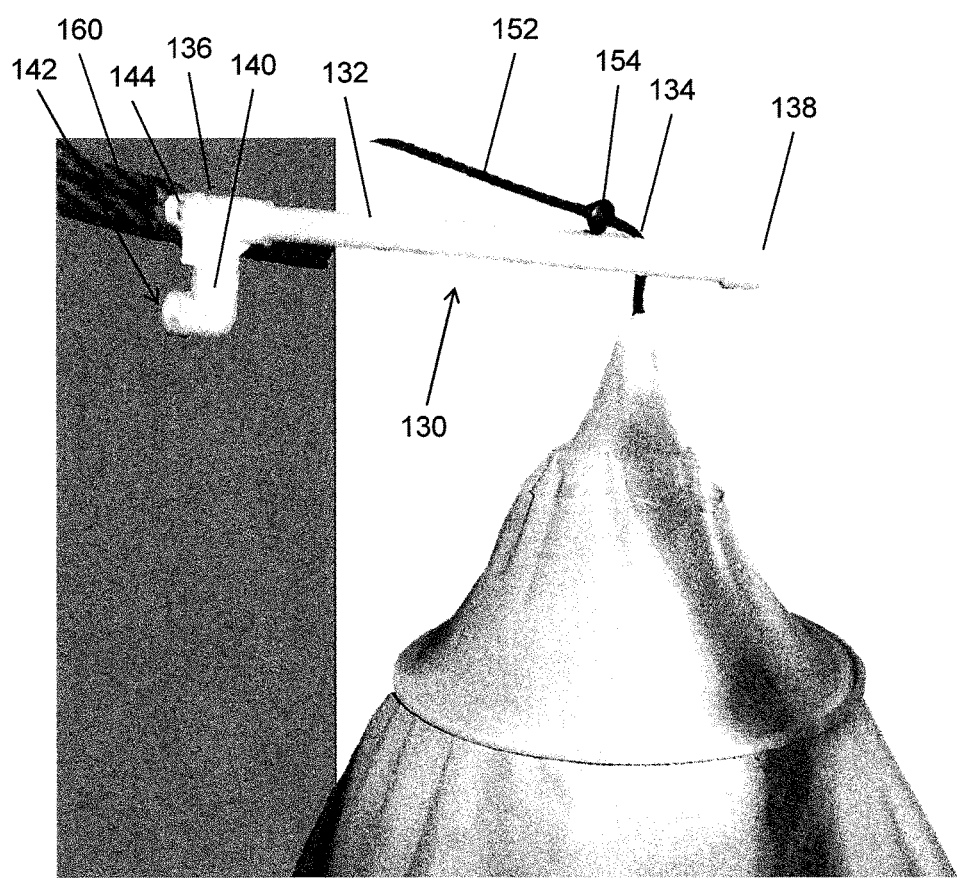
FIG. 4 is a side view picture showing a support member and a height adjustment mechanism to be used in connection with an apparatus for covering a tree stand/seat.

Referring to FIGS. 1 and 4, the apparatus 100 for covering a tree stand/seat also includes a generally horizontally oriented support member 130. The support member 130 extends between a first end 136 and a distal end 138 and includes a cantilevered beam 132. The cantilevered beam 132 is fixed at the first end 136 and extends to the distal end. The first end 136 is located adjacent to a mounting surface 126 and the distal end 138 is spaced away from the mounting surface. As used herein, mounting surface generally refers to any surface provided by a structure to which a tree stand is typically attached, including trees, posts, platforms, frames, etc., as known to those having skill in the art.

The support member 130 is generally located above the top portion 108 of the cover 102 such that the cover can be suspended from the distal end 138 of the support member. A foot 140 disposed at the first end 136 of the support member 130 extends generally downward from the support beam 132. A stop surface 142 of the foot 140 faces the mounting surface 126 and is adapted to maintain the general horizontal orientation of the support member 130 when the cover 102 is suspended from the distal end 138. In other words, the foot 140 and stop surface 142 counteract the downward force that the suspended cover exerts on the support member 130, thereby preventing the support member 130 from rotating downward and against the mounting surface 126.

The support member 130, including cantilevered beam 132 and foot 140, are shown as being made from PVC pipe and associated pipe connectors. However, it should be understood by those having skill in the art that the support member 130 can be made from any suitable material providing the necessary strength and rigidity for supporting the cover, such as wood, metal, plastic, etc. It should also be understood that the support member 130, and in particular the cantilevered beam 132, can have a shape other than the pipe shape shown, such as a square beam, a curved beam, a tapered beam, an I-beam, a T-beam, or any other shape known to those having skill in the art.

Also shown in at least FIGS. 1 and 4 is a height adjustment mechanism 150 adapted to permit movement of the cover 102 up toward the support member 130 and down away from the support member. The height adjustment mechanism 150 generally includes a cord or rope 152 and a toggle lock 154 which surrounds a portion of the cord. The height adjustment mechanism 150 is disposed on the distal end 138 of the support member 130 such that the rope 152 extends downward from the cantilevered beam 132 through an aperture 134 and attaches to an upper attachment point or grommet 116 on the top portion 108 of the cover 102. In this regard, the cover 102 can be suspended from the distal end 138 support member 130 via the height adjustment mechanism 150. The length of the portion of cord 152 extending below the support member can be increased or decreased using the toggle lock 154. To adjust the length of the cord 152, the toggle lock 154 is depressed to retract a spring activated lock (not shown), thereby permitting a user to raise or lower the cover 102 with the portion of the cord remaining above the support member. The toggle lock 154 is released to lock the cover in place at a desired height H, measured between the bottom of the support member and the garret of the cover (FIG. 1).

A reinforcement member (not shown) can be included which is adapted to reinforce the cover 102 where the height adjustment mechanism 150 attaches to the top portion 108. In other words, the reinforcement member is provided at the upper attachment point or grommet 116 to prevent the rope 152 from pulling through the cover 102. In some embodiments, the reinforcement member is a plastic cone located in the interior region 122 of the cover 102 under the frusto-conical top portion 108 and adjacent to the upper attachment point or grommet 116.

The height adjustment mechanism 150 advantageously permits the cover 102 to be mounted above the tree stand without knowing the exact distance the cover must be placed in order to adequately cover the tree stand. For example, the tree stand is typically mounted to an associated mounting surface prior to mounting support member and cover above the tree stand. If the support member is initially mounted too high above the tree stand, the cover can be lowered to desired height H with the height adjustment mechanism. Similarly, if the support member is initially mounted too close to the tree stand, the cover can be raised to desired height H with the height adjustment mechanism.

Figure 3:
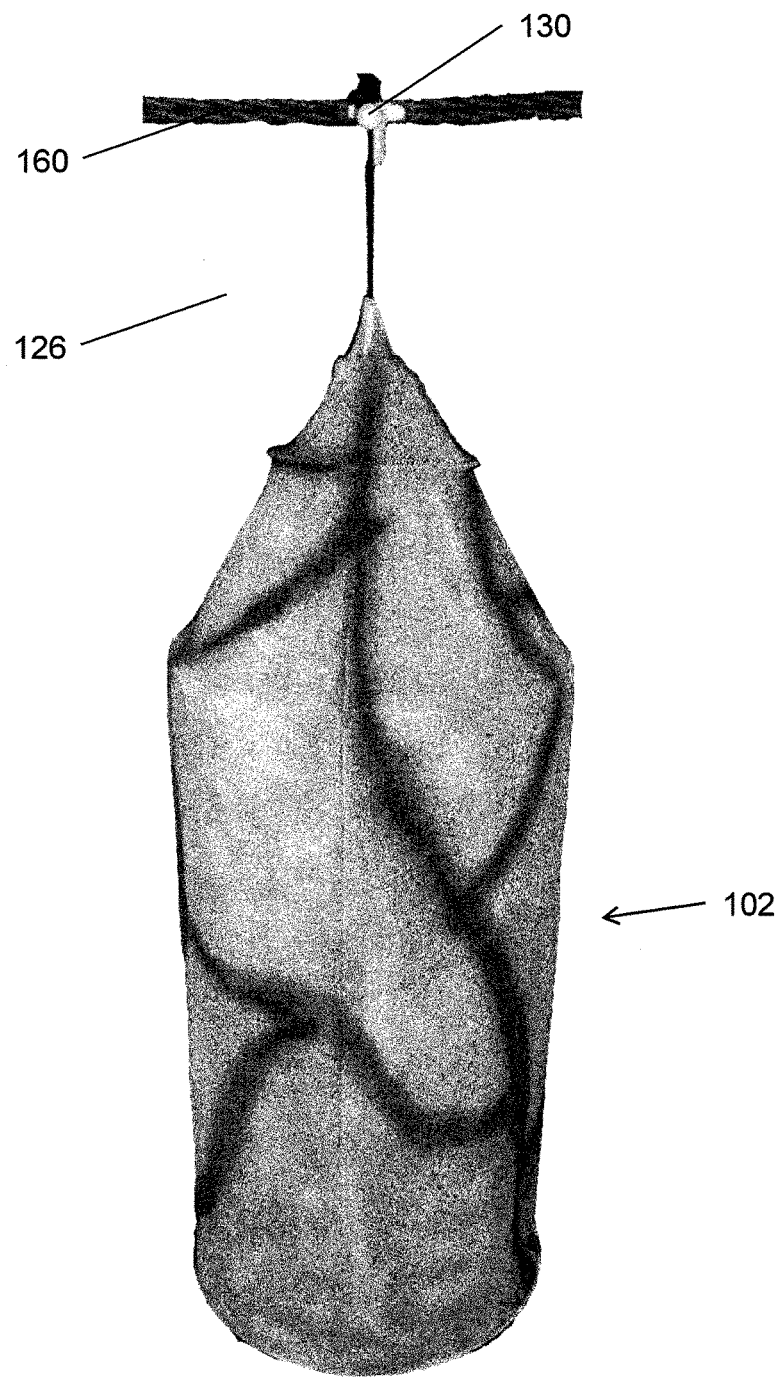
FIG. 3 is a front view picture showing additional aspects of the cover pictured in FIG. 1.
Figure 5:
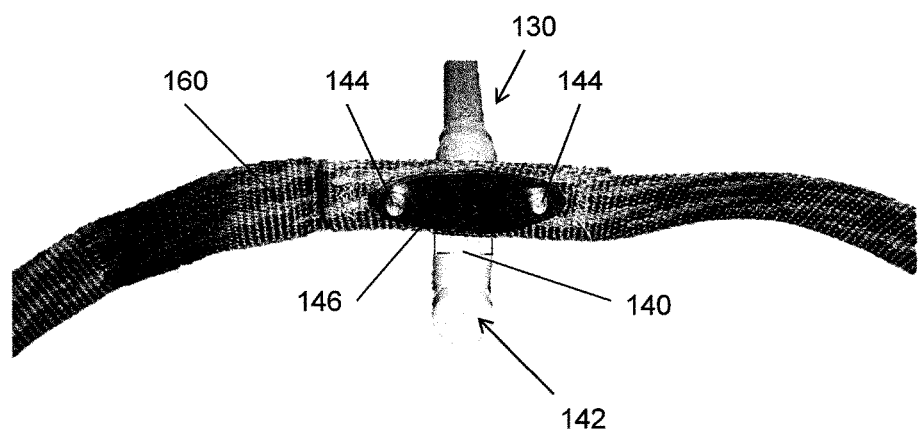
FIG. 5 is a perspective view picture of an adjustable support strap to be used in connection with the support member pictured in FIG. 4.

Referring now to FIGS. 3 and 5, an adjustable support strap 160 is shown as being attached to the support member 130. The adjustable support strap 160 is adapted to mount the support member at an initial or first position on the mounting surface 126. The cover 102 is then suspended from the distal end of the support member at the first mounting position (FIG. 3). In some embodiments, attachment means 144 are used to attach the adjustable support strap 160 to the support member 130 by clamping a portion of the adjustable support strap between support member and a retaining plate 146. The retaining plate 146 is generally disposed above the foot 140 and stop surface 142 (FIG. 5). The attachment means 144 can be any fastening hardware known to those having skill in the art, such as screws, nuts and bolts, glue, etc.

Figure 6:
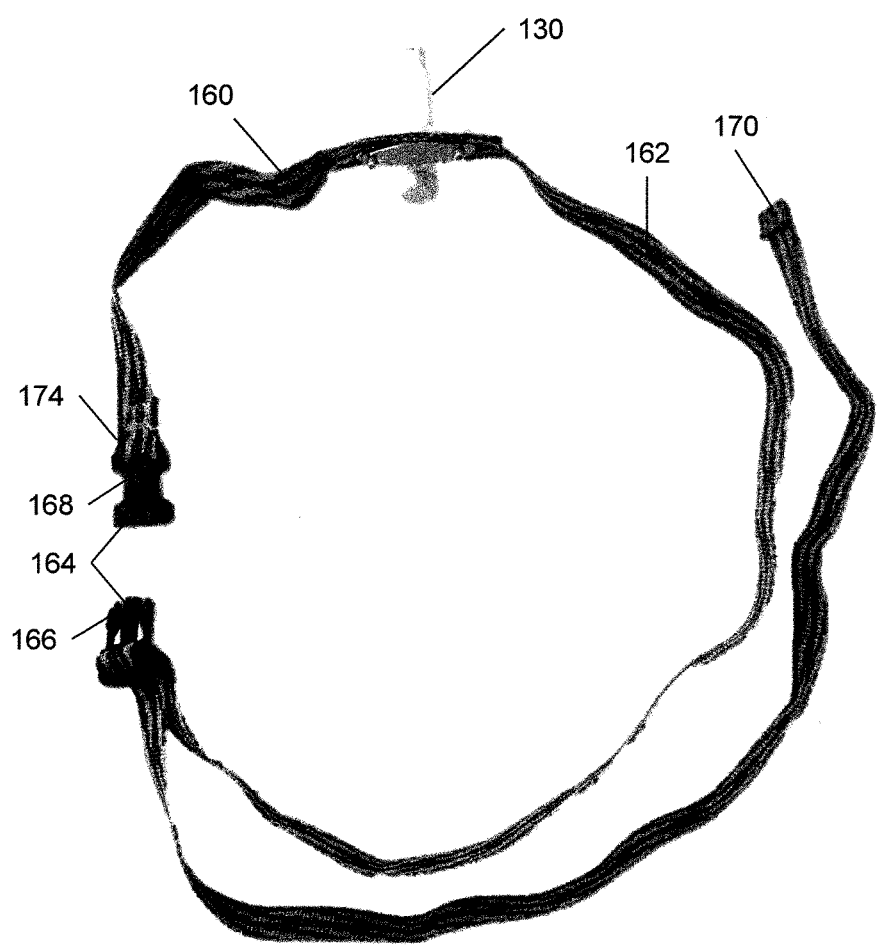
FIG. 6 is a top view picture showing additional aspects of the adjustable support strap pictured in FIG. 5.

FIG. 6 shows additional aspects of the adjustable support strap 160 attached to support member 130. The adjustable support strap 160 is made from a flexible yet durable flat webbing 162 material such as Nylon. A side-release buckle 164 is made from plastic or other lightweight and durable material. A free end 170 of the adjustable support strap 160 is threaded through a male connector 166 of the side-release buckle 164 as is known in the use of a side-release buckle. A female connector 168 of the side-release buckle 164 is attached to the adjustable support strap 160 by sewing multiple rows of stitching so that an end loop 174 is formed at one end of the adjustable support strap. A portion of the female connector 168 is then secured in the loop 174. By pulling on the free end 170 of the adjustable support strap the strap may be shortened. The adjustable support strap may also be lengthened by use of the male connector 166 of the side release buckle 164, as known in the art.

Figure 7:
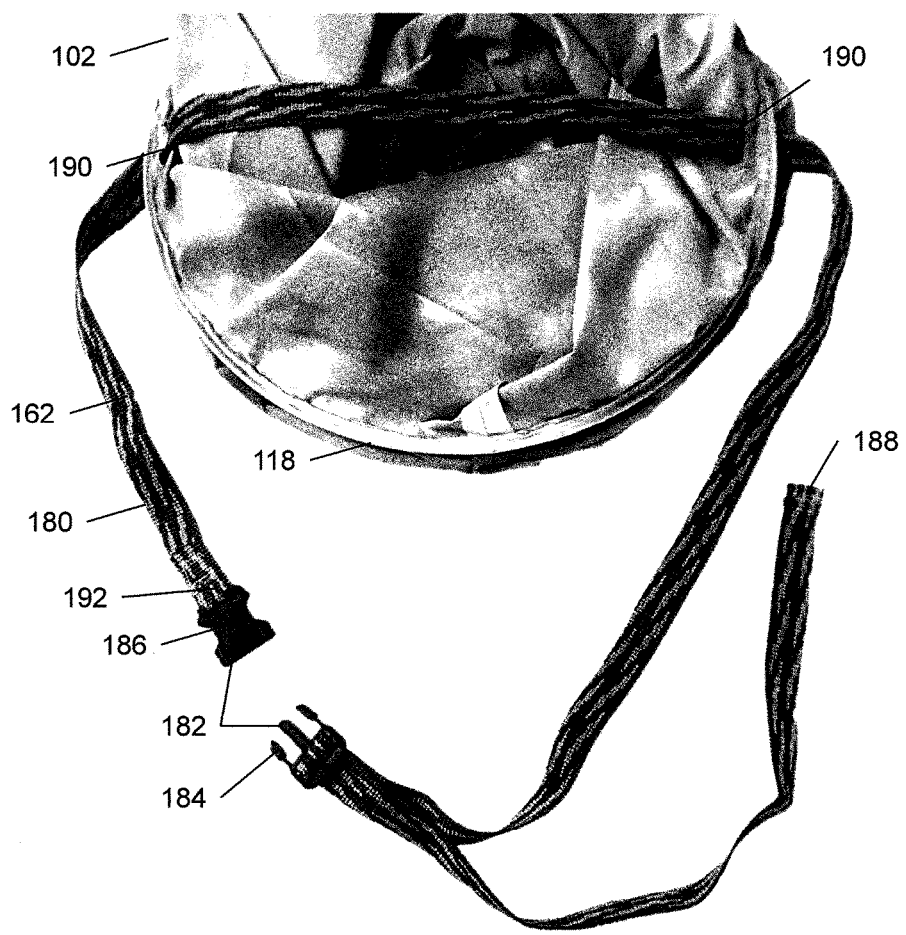
FIG. 7 is a top view picture of another adjustable support strap to be used in connection with an apparatus for covering a tree stand/seat.
Figure 8:
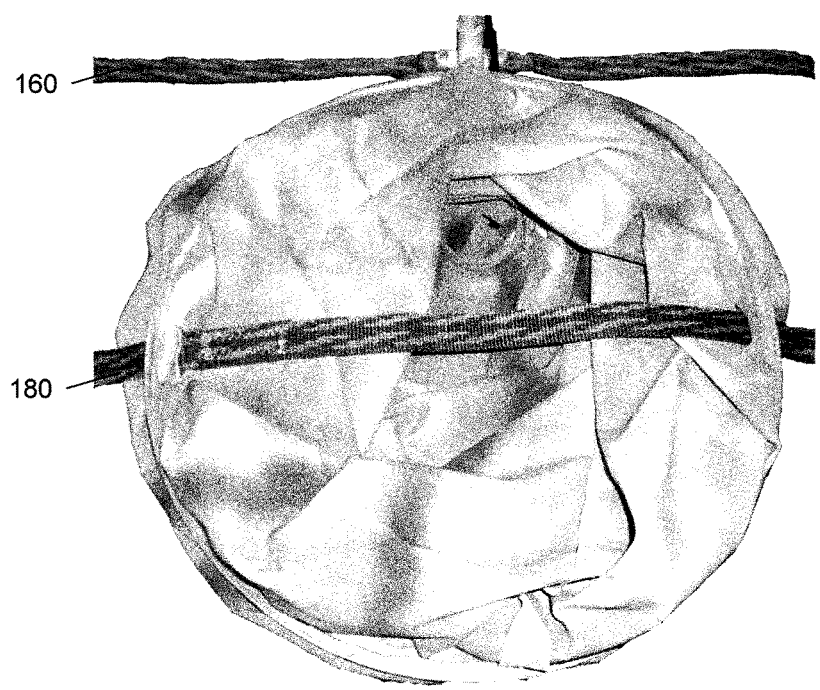
FIG. 8 is a front view picture of a cover in a storing configuration to be used in connection with an apparatus for covering a tree stand/seat.

Referring to FIGS. 7 and 8, a second adjustable support strap 180 is attached to the bottom portion 118 of the cover 102. Adjustable support strap 180 is adapted to mount the bottom portion 118 of the cover 102 at a second position. The second position can be adjacent to or spaced apart from the first mounting position provided by the adjustable support strap 160, as described in more detail below. The adjustable support strap 180 is attached to the bottom portion 118 of the cover 102 by threading the strap through slots 190. The slots 190 are located above one of the support frames 110 disposed at the bottom portion of the cover 102.

The second adjustable support strap 180 has substantially the same configuration as the adjustable support strap 160 attached to the support member 130. That is, the adjustable support strap 180 is made from a flexible yet durable flat webbing 162 material such as Nylon. A side-release buckle 182 is made from plastic or other lightweight and durable material. A free end 188 of the adjustable support strap 180 is threaded through a male connector 184 of the side-release buckle 182 as is known in the use of a side-release buckle. A female connector 186 of the side-release buckle 182 is attached to the adjustable support strap 180 by sewing multiple rows of stitching so that an end loop 192 is formed at one end of the adjustable support strap. A portion of the female connector 186 is then secured in the loop 192. By pulling on the free end 188 of the adjustable support strap the strap may be shortened. The adjustable support strap may also be lengthened by use of the male connector 184 of the side release buckle 182, as known in the art.

Methods for using the tree stand cover according to the embodiments discussed herein are also disclosed. In some embodiments, a method of using the tree stand cover 102 includes attaching the support member 130 to a mounting surface 126 of a mounting structure, such as a tree, so that the support member is oriented generally horizontal from mounting surface. The support member can be mounted to the mounting surface via an adjustable support strap, such as adjustable support strap 160. After the adjustable support strap 160 has been wrapped around the tree, the ends of the adjustable strap may be connected via side-release buckle 164 and the adjustable strap may be tightened to be secured against the mounting surface by pulling on the free end 170 of the adjustable strap. The adjustable strap 160 is adjusted by the user to the size of the tree or mounting structure to form a circle around the tree or mounting structure.

The top portion 108 of the cover 102 is then suspended from the support member 130 such that the cover extends along a vertical axis adjacent to the tree and above a tree stand. The cover 102 can be suspended from the support member 130 via the height adjustment mechanism 150, and the height can be adjusted if necessary. A bottom portion 118 of the cover 102 is connected to the tree stand to define a covering configuration. The covering configuration represents an artificial or simulated hunter having the approximate size and shape of an actual hunter. The adjustable support strap 180 can be used to connect the bottom portion of the cover to the tree stand by wrapping the strap around the tree strand, connecting the ends of the adjustable strap via side-release buckle 182, and tightening the adjustable strap to secure it against the tree stand by pulling on the free end 188 of the adjustable strap. The adjustable strap 180 is adjusted by the user to the size of the tree stand to form a circle around the tree stand. The cover can then be left in the covering configuration for a period of time to acclimate a hunting environment to the cover.

In some further embodiments, methods of using the tree stand cover 102 additionally include de-connecting the bottom portion 118 of the cover from the tree stand. The bottom portion of the cover is then lifted toward the top portion 108 of the cover such that the cover collapses against the mounting surface. The bottom portion of the cover can then be attached adjacent to the support member to define a storing configuration (FIG. 8). The adjustable support strap 180 can be used to connect the bottom portion of the cover adjacent to the support member in the same way described above for connecting the adjustable support strap 160 to the mounting surface or tree.

The cover 102 according to the embodiments disclosed herein is configurable between a covering configuration, as best seen in FIGS. 1 and 3, and a storing configuration, as best seen in FIGS. 7 and 8. The covering configuration corresponds to the first mounting position provided by the support member being spaced apart from the second mounting position of the bottom portion of the cover such that the cover fully extends from the distal end of the support member via the height adjustment mechanism. The storing configuration corresponds to the first mounting position of the support member being adjacent to the second mounting position of the bottom portion of the cover such that the cover is collapsed.

Figure 9:
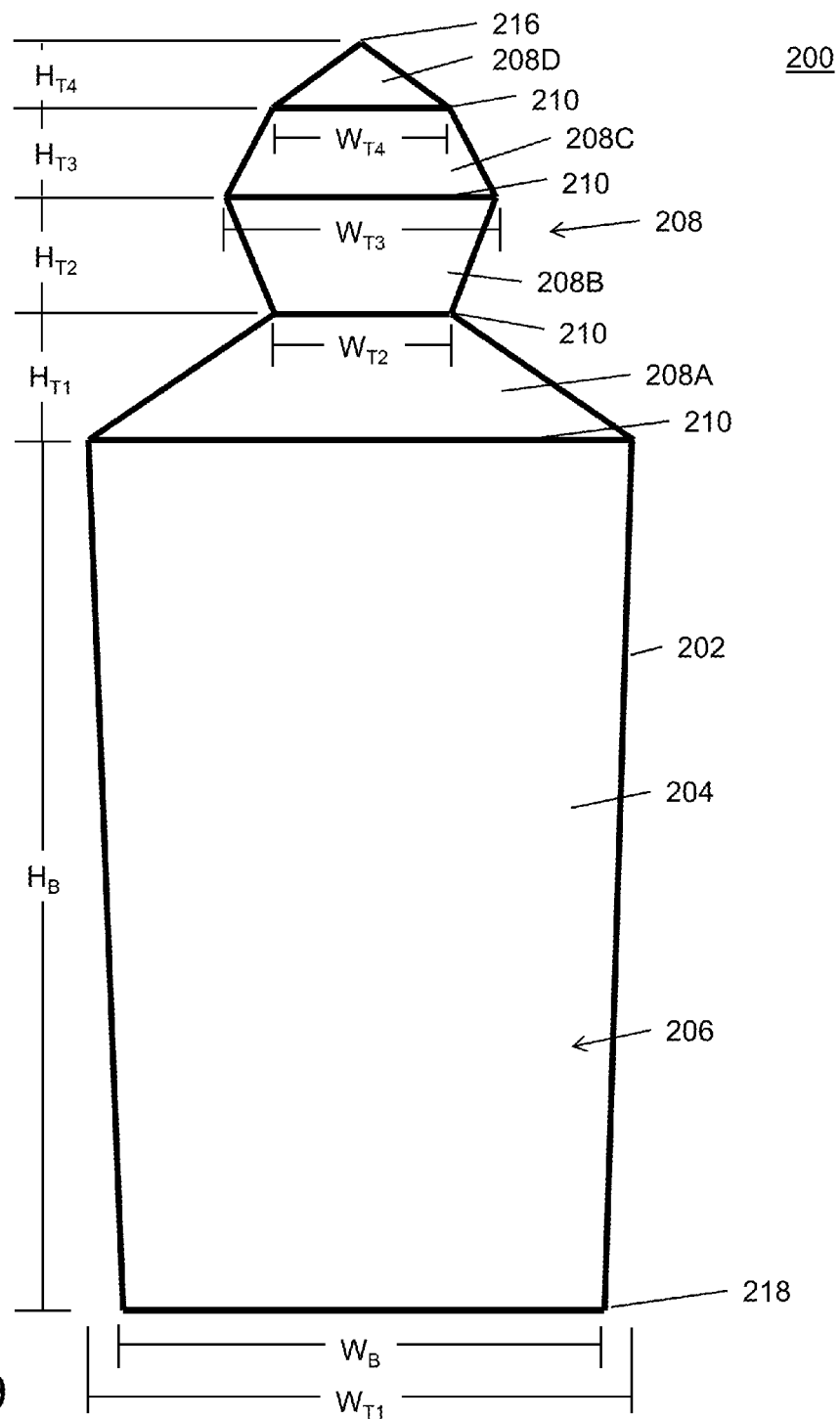
FIG. 9 is a side profile view according to a second exemplary embodiment of a cover in a covering configuration to be used in connection with an apparatus for covering a tree stand/seat.

FIG. 9 is a side profile view showing a second exemplary embodiment of an apparatus 200 for covering a tree stand/seat. A cover 102 is shown in a covering configuration and generally includes a top portion 208, a bottom portion 218, and a body portion 204. The outer surface 206 is adapted to camouflage the cover depending on the environment in which the cover is used. In other words, the outer surface 206 can be provided with any combination of materials, coloration, or illumination for concealment, either by making the cover difficult to see, or by disguising the cover as something else.

The cover 202 includes one or more support frames 210 adapted to maintain one or more shapes of the cover. The one or more shapes generally approximate the size and shape of a hunter. The support frames 210 in the top portion 208 of the cover are rings having a smaller diameter than the body portion 204 of the cover. The smaller diameter rings are concentrically aligned and spaced vertically apart to divide the top portion 208 into four frustoconical segments 208A, 208B, 208C, and 208D. The uppermost frustoconical segment 208D can include an upper attachment point or grommet 216 adapted to receive, for example, a height adjustment mechanism such as height adjustment mechanism 150 discussed above with respect to FIGS. 1-4. The one or more support frames 210 are sized to give the cover 202 adequate dimensions for covering an area approximately equal to that of the area occupied by a person in a tree stand. In other words, the cover 202 is sized such that a person can comfortably move within the cover.

In this regard, the body 204 can have a height $H_B$ approximately equal to the height of the torso of the person occupying the tree stand. A diameter or width $W_B$ of the cover body 204 can similarly be sized to the approximate width or diameter of the torso of the person occupying the tree stand. In some particular embodiments, height $H_B$ has a value of about 29 inches and a width $W_B$ of about 16 inches.

The top portion 208 can generally be sized to accommodate the shoulders and head of a person occupying the tree stand. In this regard, the top portion 208A can have a height $H_{T1}$ and a diameter or width $W_{T1}$ corresponding to the approximate height and width of a person's shoulders. In some particular embodiments, height $H_{T1}$ and width $W_{T1}$ have a value of about 4 inches and about 18 inches, respectively.

Top portions 208B, 208C, and 208D of the cover can generally be sized to accommodate a person's neck and head. Accordingly, height $H_{T2}$ and diameter or width $W_{T2}$ of top portion 208B correspond to the approximate height and width of a person's neck, while heights $H_{T3}$, $H_{T4}$ and diameters or widths $W_{T3}$, $W_{T4}$ of top portions 208C and 208D correspond to the approximate height and width or diameter of a person's head, respectively. In some particular embodiments $H_{T2}$, $H_{T3}$, and $H_{T4}$ correspond to a height of 4 inches, 3 inches, and 2 inches, respectively, while $W_{T2}$, $W_{T3}$, and $W_{T4}$ correspond to a width of 6 inches, 9 inches, and 6 inches, respectively.

It should be understood that the dimensions of the cover body 204 and top portions 208A, 208B, 208C, and 208D can have any value suitable for approximating the area covered by a person occupying the tree stand. For example, the dimensions can be sized smaller or larger to accommodate persons of different size.

Figure 10:
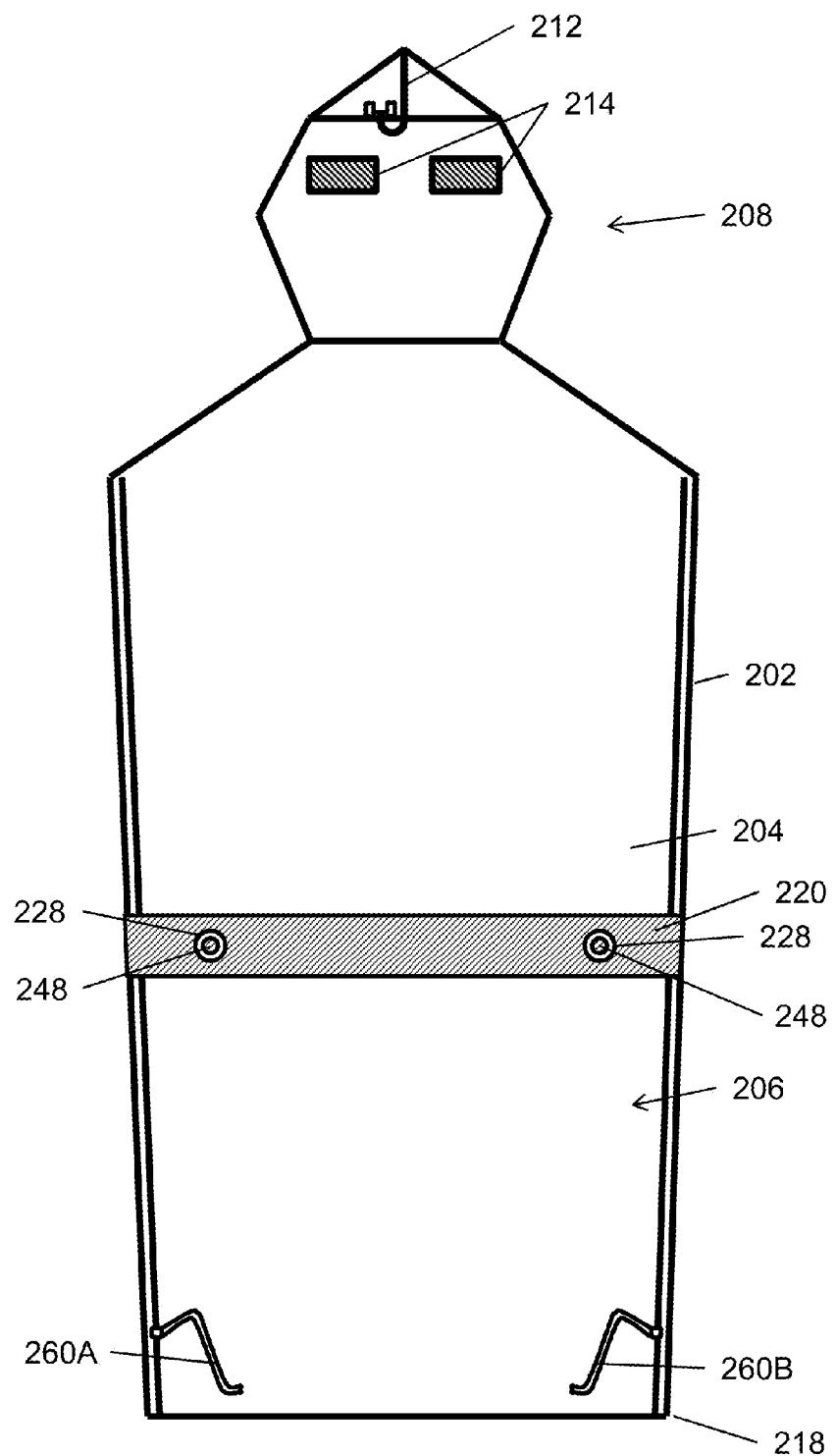
FIG. 10 is a side profile view showing additional aspects of the cover of FIG. 9.

Referring now to FIG. 10, additional aspects of the cover 202 can be seen. The top portion 208 of the cover 202 can be provided with a hook or clamping mechanism 212 for hanging or attaching various garments inside or outside of the cover. Reflective material can also be provided on the outer surface 206 of the cover, such as reflective patches 214 located adjacent the top portion 208. Reflective patches can be spaced apart from each other at any desired interval. In some particular embodiments, the reflective patches are spaced at approximately 2 inch intervals. Although only two reflective patches are illustrated in FIG. 10, it should be understood that any desired number of reflective patches can be included on the cover. A reflective strip 220 located adjacent a central portion of the cover body 204 can also be provided. Reflective portions 214 and 220 aid in locating the top portion 208 and the body portion 204 of the cover in dark conditions.

The reflective strip 220 can additionally include one or more eyelets or grommets 228. Holes 248 at the center of the grommets 228 permit the lacing of a tightening mechanism (not shown), such as a wire, rope, cable or line. The tightening mechanism is adapted to adjust the width or diameter of the cover body 204 if desired. In this regard, the tightening mechanism can be routed through the outer surface 206 of the cover body 204 and into the interior region (FIG. 2) via a first grommet and associated hole. The tightening mechanism can then exit through a second grommet and associated hole. This threading operation continues until the tightening mechanism is threaded circumferentially around the cover body 204.

The grommets 228 can be provided at any suitable interval around the outer surface of the cover body 204. In some particular embodiments, the one or more grommets are spaced apart from each other at intervals of about 10 inches. The grommets 228 aid in preventing tearing or abrasion of the cover body near at the area near the holes 248 when a tightening mechanism is provided. Only two grommets are illustrated in FIG. 10, however it should be understood that any number of grommets can be provided.

FIG. 10 also shows adjustable straps or cords 260A and 260B located adjacent the bottom portion 218 of the cover 202. Adjustable straps 260A and 260B are adapted to adjust the height $H_B$ (FIG. 9) of the cover body 204. Adjustable straps 260A and 260B can be provided as hook and loop type fasteners or ties.

Figure 11:
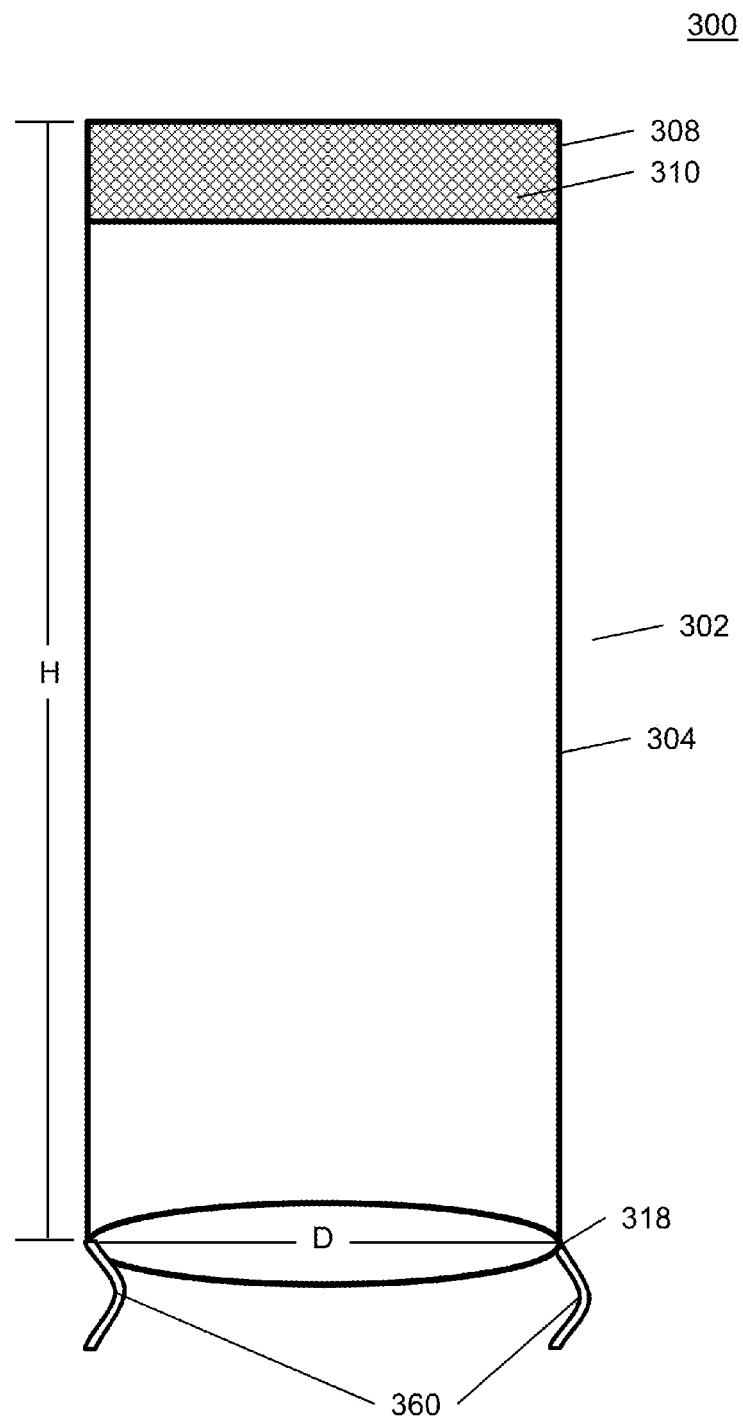
FIG. 11 is a side profile view according to a third exemplary embodiment of a cover in a covering configuration to be used in connection with an apparatus for covering a tree stand/seat.

Referring now to FIG. 11, a side profile view of a third exemplary embodiment of an apparatus 300 for covering a tree stand/seat is shown. A cover 302 is shown as generally including a top portion 308, a bottom portion 318, and a cover body 304. The cover 302 is dimensioned to surround the legs of a person occupying a tree stand. In this regard, the cover 302 extends a height H approximately equal to the height of the legs of a person occupying a tree stand. The cover 302 similarly extends circumferentially around a central axis at a diameter D approximately equal to the width of the legs of a person occupying a tree stand. In some particular embodiments, the cover 302 has a height of 29 inches and a diameter of 12 inches. However, it should be understood that the cover 302 can have any dimension suitable for approximating the area covered by a person's legs occupying the tree stand.

The top portion 308 of cover 302 is adapted to attach to the bottom portion 118, 218 of cover 102 or 202 (FIGS. 1 and 9, respectively). In this regard, the top portion 308 can be provided with hook and loop type fasters 310 which attach to a corresponding hook and loop type fastener (not shown) provided at the bottom portion 118, 218 of cover 102 or 202 (FIGS. 1 and 9, respectively). The bottom portion 318 of the cover is adapted to attach to an associated tree strand or platform (not shown). In this regard, the bottom portion 318 is provided with straps 360. Straps 360 can be hook and loop type fasteners or ties. In some embodiments where straps 360 are provided as hook and loop type fasteners, a corresponding hook and loop type fastener (not shown) can be provided on the tree stand or platform for attachment thereto.

Figure 12:
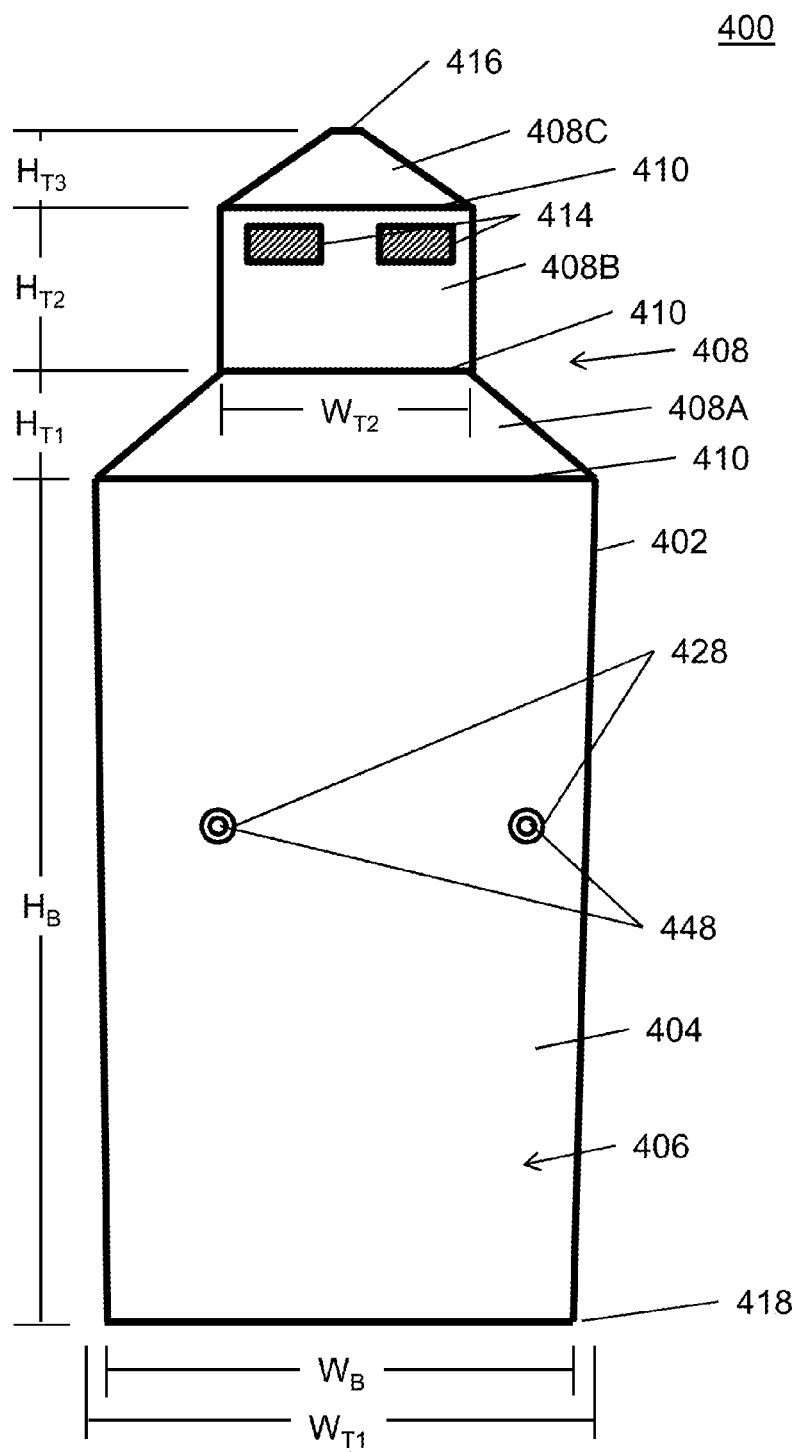
FIG. 12 is a side profile view according to a third exemplary embodiment of a cover in a covering configuration to be used in connection with an apparatus fo covering a tree stand/seat.

FIG. 12 is a side profile view showing a fourth exemplary embodiment of an apparatus 400 for covering a tree stand/seat. A cover 402 is shown in a covering configuration and generally includes a top portion 408, a bottom portion 418, and a body portion 404. The outer surface 406 is adapted to camouflage the cover depending on the environment in which the cover is used. In other words, the outer surface 406 can be provided with any combination of materials, coloration, or illumination for concealment, either by making the cover difficult to see, or by disguising the cover as something else.

The cover 402 includes one or more support frames 410 adapted to maintain one or more shapes of the cover. The one or more shapes generally approximate the size and shape of a hunter. The support frames 410 are generally ring shapes and some support frames can have a smaller diameter than others. For example, some of the frames 410 in the top portion 408 of the cover are rings that have a diameter smaller than the diameter of some portions of the body portion 404 of the cover, such as the bottom portion 418. The rings 410 are spaced vertically apart to divide the top portion 408 into two frustoconical segments 408A and 408C, and one cylindrical segment 408B. The uppermost frustoconical segment 408D can include an upper attachment point or grommet 416 adapted to receive, for example, a height adjustment mechanism such as height adjustment mechanism 150 discussed above with respect to FIGS. 1-4. The one or more support frames 410 are sized to give the cover 402 adequate dimensions for covering an area approximately equal to that of the area occupied by a person in a tree stand. In other words, the cover 402 is sized such that a person can comfortably move within the cover, without the need for a separate cover for covering the legs of the person, e.g., the leg cover 302 illustrated in FIG. 11 and described above.

In this regard, the body 404 can have a height $H_B$ approximately equal to the height of the body of the person occupying the tree stand, including substantially all of the person's torso and legs. A diameter or width $W_B$ of the cover body 404 can similarly be sized to the approximate width or diameter of the body of the person occupying the tree stand.

In some particular embodiments, height $H_B$ has a value of about 60 inches and a width $W_B$ of about 16 inches.

The top portion 408 can generally be sized to accommodate the shoulders and head of a person occupying the tree stand. In this regard, the top portion 408A can have a height $H_{T1}$ and a diameter or width $W_{T1}$ corresponding to the approximate height and width of a person's shoulders. In some particular embodiments, height $H_{T1}$ and width $W_{T1}$ have a value of about 4 inches and about 18 inches, respectively.

Top portions 408B and 408C of the cover can generally be sized to accommodate a person's neck and head. Accordingly, heights $H_{T2}$, $H_{T3}$ and diameter or width $W_{T2}$ of top portion 408B correspond to the approximate height and width of a person's neck and head. In some particular embodiments $H_{T2}$ and $H_{T3}$ correspond to a height of 6 inches and 3 inches, respectively, while $W_{T2}$, corresponds to a width of 9 inches. The embodiment illustrated in FIG. 12 thus differs from the embodiments illustrated in FIGS. 9 and 10 in that the top portion 408 has a geometry that is generally less complex than the geometry of the top portion 208, which may aid in reducing manufacturing costs.

The top portion 408B can include reflective material patches 414 spaced apart from each other at any desired interval, however, the reflective material patches 414 are generally spaced evenly around the cylindrical top portion 408B. Although only two reflective patches are illustrated in FIG. 12, it should be understood that any desired number of reflective patches can be included on the top portion 408B.

The cover 402 can additionally include one or more eyelets or grommets 428. Holes 448 at the center of the grommets 428 permit the lacing of a tightening mechanism (not shown), such as a wire, rope, cable or line. The tightening mechanism is adapted to adjust the width or diameter of the cover body 404 if desired. In this regard, the tightening mechanism can be routed through the outer surface 406 of the cover body 404 and into the interior region (FIG. 2) via a first grommet and associated hole. The tightening mechanism can then exit through a second grommet and associated hole. This threading operation continues until the tightening mechanism is threaded circumferentially around the cover body 404.

The grommets 428 can be provided at any suitable interval around the outer surface of the cover body 404. In some particular embodiments, the one or more grommets are spaced apart from each other at intervals of about 10 inches. The grommets 428 aid in preventing tearing or abrasion of the cover body near at the area near the holes 448 when a tightening mechanism is provided. Only two grommets are illustrated in FIG. 12, however it should be understood that any number of grommets can be provided.

It should be understood that the dimensions of the cover body 404 and top portions 408A, 408B, and 408C can have any value suitable for approximating the area covered by a person's body occupying the tree stand. For example, the dimensions can be sized smaller or larger to accommodate persons of different size.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A tree stand/seat cover for acclimating game animals to the size or shape of a hunter, comprising:
 - a cover having a top portion, a bottom portion, and a body portion extending between the top and bottom portions, the cover being configurable between a covering configuration and a storing configuration,
 - a generally horizontally oriented support member located above the top portion of the cover and extending between a first end and a distal end, the support member having an aperture on the distal end thereof, and
 - a height adjustment mechanism on the distal end of the support member, the height adjustment mechanism having a cord that extends through the aperture of the support member to attach to the top portion of the cover and a spring-activated lock that surrounds a portion of the cord and is disposed on the distal end of the support member,
 - wherein the covering configuration corresponds to the support member being mounted at a first position, the cover being suspended from its top portion at the distal end of the support member via the height adjustment mechanism, and the bottom portion of the cover being mounted at a second position spaced apart from the first position, and
 - wherein the storing configuration corresponds to the bottom portion of the cover being located adjacent the top portion, the distal end of the support member, and the height adjustment mechanism.

2. The tree stand cover of claim 1, further comprising an adjustable support strap attached to the support member, the adjustable support strap adapted to mount the support member at the first position.

3. The tree stand cover of claim 1, further comprising an adjustable support strap attached to the bottom portion of the cover, the adjustable support strap adapted to mount the bottom portion of the cover at the second position.

4. The tree stand cover of claim 1, wherein the cover includes one or more support frames adapted to maintain one or more shapes of the cover.

5. The tree stand cover of claim 4, wherein the one or more support frames are removable.

6. The tree stand cover of claim 1, further comprising a second cover attached to the bottom portion of the cover.

7. The tree stand cover of claim 1, further comprising a reinforcement member adapted to reinforce the cover where the height adjustment mechanism attaches to the top portion of the cover.

8. The tree stand cover of claim 1, wherein the spring-activated lock is adapted to permit movement of the cover in the covering configuration down toward the tree stand/seat cover and up away from the tree stand/seat cover.

9. The tree stand cover of claim 1, wherein the support member includes a foot having a stop surface adapted to maintain the general horizontal orientation of the support member.

10. The tree stand cover of claim 1, wherein the cover includes an outer surface adapted to camouflage the cover.

11. The tree stand cover of claim 1, further comprising at least one reflective material adjacent the top portion or body portion of the cover.

12. The tree stand cover of claim 1, further comprising a hook adjacent the top portion of the cover.

13. The tree stand cover of claim 1 further comprising one or more grommets disposed around the body portion of the cover and adapted to permit the lacing of a tightening mechanism.

14. The tree stand cover of claim 1, wherein the spring-activated lock is configured to adjust a distance between the top portion of the cover and the support member at the distal end thereof.

15. A tree stand/seat cover for acclimating game to the size or shape of a hunter, comprising:
- a collapsible cover configurable between a covering configuration and a storing configuration, the cover including a top portion, a bottom portion, a body portion extending between the top and bottom portions, and one or more support frames adapted to maintain one or more shapes of the cover,
- a generally horizontally oriented support member located above the top portion of the cover and extending between a first end and a distal end, the support member having an aperture on the distal end thereof,
- a height adjustment mechanism disposed on the distal end of the support member, the height adjustment mechanism comprising:
  - a cord that extends through the aperture of the support member and attaches to the top portion of the cover, and
  - a spring-activated lock that surrounds a portion of the cord and is disposed on the distal end of the support member,
- a first adjustable support strap attached to the support member and a second adjustable support strap attached to the bottom portion of the cover,
- wherein the first support strap is adapted to mount the support member at a first position and the second support strap is adapted to mount the bottom portion of the cover at a second position,
- wherein the covering configuration corresponds to the support member being mounted at the first position, the cover being suspended from its top portion via the height adjustment mechanism at the distal end of the support member, the bottom portion of the cover being mounted at the second position, and the first and second positions being spaced apart from each other,
- wherein the storing configuration corresponds to the bottom portion of the cover being located adjacent the top portion, the distal end of the support member, and the height adjustment mechanism.

16. A method for acclimating game to a hunting environment, comprising:
- attaching a support member to a mounting surface such that the support member is oriented generally horizontal from the mounting surface, the support member including a height adjustment mechanism and an aperture located on a distal end of the support member, the height adjustment mechanism including a cord that extends through the aperture of the support member and a spring-activated lock that surrounds a portion of the cord and is disposed on the distal end of the support member,
- suspending a collapsible cover from the distal end of the support member, the cover being attached to the cord of the height adjustment mechanism,
- placing the collapsible cover in a covering configuration over a tree stand to simulate the size and shape of a hunter on the tree stand,
- leaving the cover in the covering configuration for a period of time to allow game to become accustomed to the simulated hunter; and
- collapsing the cover in a storing configuration above the tree stand.

17. The method of claim 16, further comprising:
- connecting a bottom portion of the cover to the tree stand to define the covering configuration,
- lifting the bottom portion of the cover toward a top portion and against the mounting surface, and
- attaching the bottom portion of the cover adjacent to the support member to define the storing configuration.

18. The method of claim 16, further comprising raising or lowering the collapsible cover with respect to the tree stand at the distal end of the support member with the height adjustment mechanism.

19. The method of claim 16, further comprising depressing the spring-activated lock at the distal end of the support member to increase or decrease a length of the cord below the distal end of the support member.

20. The method of claim 19, further comprising releasing the spring-activated lock at the distal end of the support member to lock the cord at a desired length below the distal end of the support member.

* * * * *